United States Patent
Christy

(12) 
(10) Patent No.: US 6,301,554 B1
(45) Date of Patent: Oct. 9, 2001

(54) LANGUAGE TRANSLATION USING A CONSTRAINED GRAMMAR IN THE FORM OF STRUCTURED SENTENCES FORMED ACCORDING TO PRE-DEFINED GRAMMAR TEMPLATES

(75) Inventor: Samuel T. Christy, North Cambridge, MA (US)

(73) Assignee: WordStream, Inc., Somerville, MA (US)

( * ) Notice: Subject to any disclaimer, the term of this patent is extended or adjusted under 35 U.S.C. 154(b) by 0 days.

(21) Appl. No.: 09/405,515

(22) Filed: Sep. 23, 1999

(51) Int. Cl.⁷ .................................................. G06F 17/28
(52) U.S. Cl. .................................................. 704/7; 704/4
(58) Field of Search ................................. 704/2, 3, 4, 5, 704/6, 7, 8, 9, 10, 277; 707/531, 532, 536

(56) References Cited

U.S. PATENT DOCUMENTS

| | | | |
|---|---|---|---|
| 4,829,423 | * 5/1989 | Tennant et al. | 704/8 |
| 5,020,021 | 5/1991 | Kaji et al. | 704/5 |
| 5,237,502 | 8/1993 | White et al. | 704/1 |
| 5,371,674 | 12/1994 | Obuchi | 704/5 |
| 5,373,441 | 12/1994 | Hirai et al. | 704/2 |
| 5,386,556 | 1/1995 | Hedin et al. | 704/4 |
| 5,426,583 | 6/1995 | Uribe-Echebarria | 704/2 |
| 5,490,061 | 2/1996 | Tolin et al. | 704/2 |
| 5,493,678 | 2/1996 | Arcuri et al. | 704/1 |
| 5,497,319 | 3/1996 | Chong et al. | 704/2 |
| 5,587,903 | 12/1996 | Yale | 704/9 |
| 5,659,765 | 8/1997 | Nii | 704/4 |
| 5,677,835 | 10/1997 | Carbonell et al. | 704/8 |
| 5,884,247 | * 3/1999 | Christy | 704/7 |
| 5,995,918 | * 11/1999 | Kendall et al. | 704/1 |
| 5,995,920 | * 11/1999 | Carbonell et al. | 704/9 |

FOREIGN PATENT DOCUMENTS

| | | |
|---|---|---|
| 0610151A1 | 8/1994 | (EP) . |
| 0672989A2 | 9/1995 | (EP) . |
| WO88/05946 | 8/1988 | (WO) . |
| WO 98/19254 | * 5/1998 | (WO) . |

OTHER PUBLICATIONS

Pym, "Pre–Editing and the Use of Simplified Writing for MT: An Engineer's Ex–perience of Operating an MT System," Translating and the Computer 10 (1990).

"Regular Language Transcription Machine," IBM Technical Disclosure Bulletin, Jun. 1982.

"Survey of the State of the Art in Human Language Technology," Center for Spo–ken Language Understanding, Apr. 1997.

Shubert et al., "The Translatability of Simplified English in Procedure Docu–ments," 1995 IEEE Int'l Professional Commun. Conf.

Quinlan et al., "Sublanguage: Characteristics and Selection Guidelines for MT," Proc. Ann. Irish Conf. on Artif. Intell. and Cog. Sci. (1992).

McCaskey et al., "Ez Japanese Writer," Computers and the Humanities 26:301–305 (1992).

\* cited by examiner

*Primary Examiner*—Joseph Thomas
(74) *Attorney, Agent, or Firm*—Testa Hurwitz & Thibeau L

(57) ABSTRACT

Natural-language sentences are represented in accordance with a con-strained grammar and vocabulary structured to permit direct substitution of linguistic units in one language for corresponding linguistic units in another language. The vocabulary may be represented in a series of physically or logically distinct databases, each containing entries representing a form class as defined in the grammar. Translation involves direct lookup between the entries of a reference sentence and the corresponding entries in one or more target languages.

18 Claims, 1 Drawing Sheet

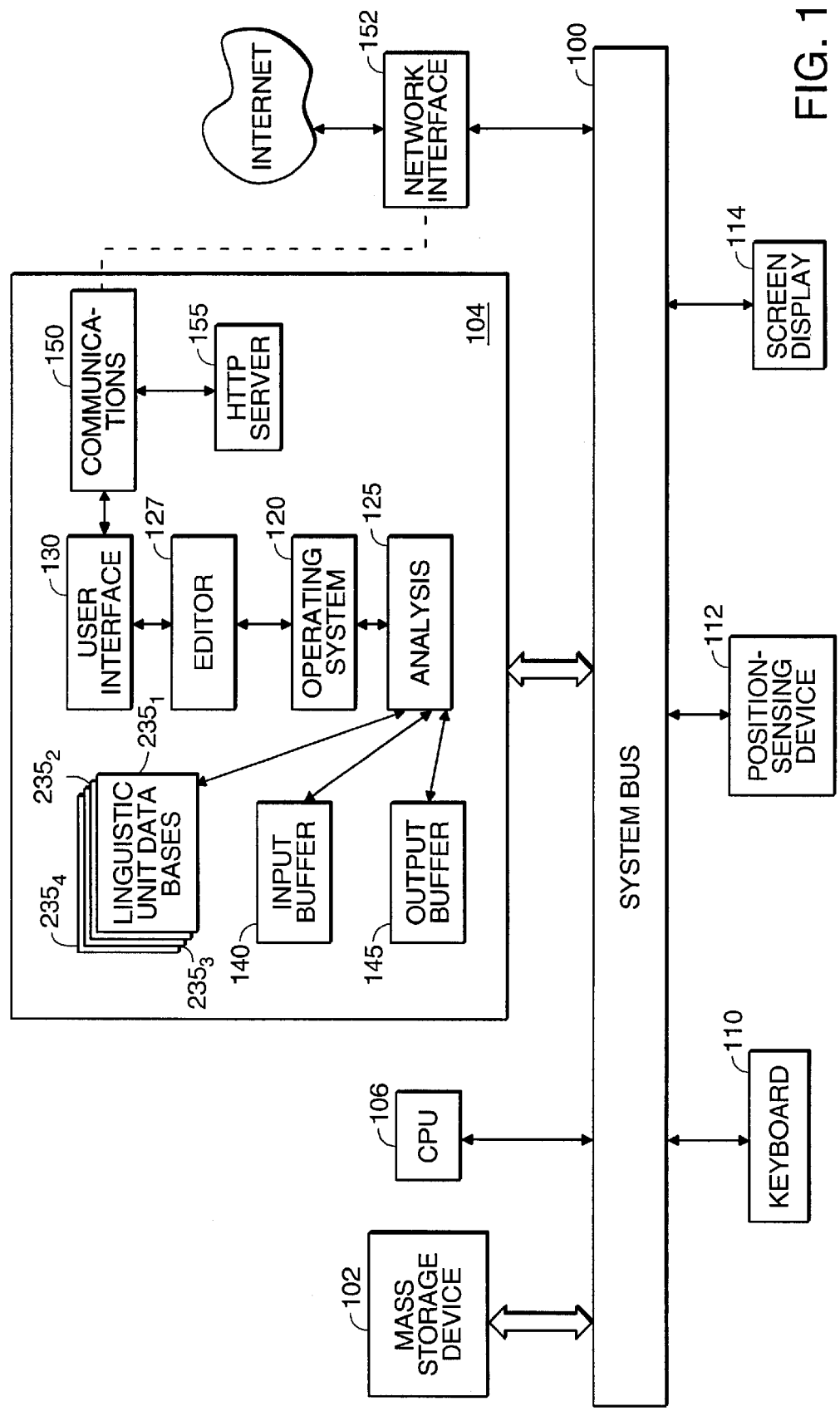

LANGUAGE TRANSLATION USING A CONSTRAINED GRAMMAR IN THE FORM OF STRUCTURED SENTENCES FORMED ACCORDING TO PRE-DEFINED GRAMMAR TEMPLATES

BACKGROUND OF THE INVENTION

Since the time when improvements in transportation began to significantly reduce the inconvenience and cost of cross-border travel, the desirability of universal communication has been recognized. In the 1960s, for example, international efforts were made to promote Esperanto as a universal language. While that effort ultimately failed, the large number of fluent speakers—between 1 and 15 million worldwide—and the scope of the efforts illustrate the problem's importance. Esperanto did not succeed because it required acquisition of both a new grammar and a new vocabulary, the latter posing a far greater challenge for would-be speakers.

The improving ease and speed with which information can now be transmitted worldwide has augmented the need for universal communication. Current efforts have focused most heavily on automated translation among languages. Systems now in use generally store, in a source and a target language, millions of frequently used words, phrases and combinations, relying for accuracy and robustness on the occurrences in the text to be translated. Such systems are by definition incomplete, since no system can possibly store every possible word combination, and their usefulness varies with the linguistic idiosyncracies of their designers and users. It is almost always necessary for a human to check and modify the output translation. These systems also translate one word at a time (and so operate slowly), and require a separate database unique to each target language. Moreover, because they are programmed to recognize distinctive language characteristics and their unique mappings from one language to another, each translation must be done individually. In other words, the time required for multiple translations is the sum of the times for each translation performed individually.

Translation is difficult for numerous reasons, including the lack of one-to-one word correspondences among languages, the existence in every language of homonyms, and the fact that natural grammars are idiosyncratic; they do not conform to an exact set of rules that would facilitate direct, word-to-word substitution. It is toward a computational "understanding" of these idiosyncracies that many artificial-intelligence research efforts have been directed, and their limited success testifies to the complexity of the problem.

U.S. Pat. No. 5,884,247 (issued Mar. 16, 1999) describes an approach toward language translation in which natural-language sentences are represented in accordance with a constrained grammar and vocabulary structured to permit direct substitution of linguistic units in one language for corresponding linguistic units in another language. The vocabulary may be represented in a series of physically or logically distinct databases, each containing entries representing a form class as defined in the grammar. Translation involves direct lookup between the entries of a reference sentence and the corresponding entries in one or more target languages.

In accordance with the '247 patent, sentences may be composed of "linguistic units," each of which may be one or a few words, from the allowed form classes. The list of all allowed entries in all classes represents the global lexicon, and to construct an allowed sentence, entries from the form classes are combined according to fixed expansion rules.

Sentences in accordance with the '247 patent are constructed from terms in the lexicon according to four expansion rules. In essence, the expansion rules serve as generic blueprints according to which allowed sentences may be assembled from the building blocks of the lexicon. These few rules are capable of generating a limitless number of sentence structures. This is advantageous in that the more sentence structures that are allowed, the more precise will be the meaning that can be conveyed within the constrained grammar. On the other hand, this approach renders computationally difficult the task of checking user entries in real time for conformance to the constrained grammar.

SUMMARY OF THE INVENTION

In accordance with the invention, the constrained grammar is defined in terms of allowed sentence types (rather than in terms of expansion rules capable of generating a virtually limitless number of sentence types). In this way, it is possible to easily check user input (word by word, or in the form of an entire document) for conformance to the grammar, and to suggest alternatives to sentences that do not conform.

As in the '247 patent, the present invention provides an artificial grammar for expressing the thoughts and information ordinarily conveyed in a natural grammar, but in a structured format amenable to automated translation. The allowed sentence types are sufficiently diverse to permit expression of sophisticated concepts, but, because sentences are derived from an organized vocabulary according to fixed rules, they can be readily translated from one language to another. Preferably, the vocabulary is represented in a series of physically or logically distinct databases, each containing entries representing a form class as defined in the grammar. Translation involves direct lookup between the entries of a reference sentence and the corresponding entries in one or more target languages.

Accordingly, to use the invention, a natural-language sentence is either drafted in accordance with the allowed sentence structures, or translated or decomposed into the (typically) simpler grammar of the invention but preserving the original vocabulary. User input may be received via an editor programmed to follow the user's inputted text for conformity with the allowed sentence structures.

The translated output is as easily understood by a native speaker of the target language as the input was to the author of the original text. Thus, it is possible to carry out "conversations" in the grammar of the invention by formulating statements according to the grammar, passing these to an interlocutor for translation and response, and translating the interlocutor's responses. For example, a business person native to the United States and without knowledge of German can conduct a meeting with native German speakers using as a translation device a laptop computer configured in accordance with the invention, exchanging thoughts via the computer. Indeed, the same thoughts may be simultaneously broadcast to multiple interlocutors each speaking a different language, with their individual responses simultaneously and multiply translated as well. Correspondents can exchange messages by e-mail, in their native languages, simply by formulating the messages in accordance with the invention's grammar; recipients speaking different languages who have e-mail systems implementing the invention receive the message translated into their native languages, and their responses are automatically translated into the original sender's language upon their arrival; in this way, each correspondent is exposed only his or her native language.

The invention is advantageously employed even in situations demanding an ultimate output in a natural language, since translation to this format is readily accomplished. For example, a news reporter might file a story worded in the invention's grammar for dissemination to numerous bureaus serving different national audiences. The story is instantly translated into the appropriate languages upon arrival at the different bureaus, where it may then be further refined into a form suitable for communication to the audience. The skills required if further translation is desired are essentially editorial in nature, and thus require less specialized training than would be necessary, for example, for true language translation; indeed, communications media already employ personnel to carry out the similar tasks of editing and revising raw news material taken from wire services.

BRIEF DESCRIPTION OF THE DRAWING

The foregoing discussion will be understood more readily from the following detailed description of the invention, when taken in conjunction with the single FIGURE of the drawing, which illustrates a hardware apparatus embodying the invention.

DETAILED DESCRIPTION OF AN ILLUSTRATIVE EMBODIMENT

As in the '247 patent, the four linguistic-unit classes employed in the preferred embodiment of the invention are: "things" or nominal terms that connote, for example, people, places, items, activities or ideas; "connectors" that specify relationships between two (or more) nominal terms (including words typically described as prepositions and conjunctions, and terms describing relationships in terms of action, being, or states of being); "descriptors" modifying the state of one or more nominal terms (including words typically described as adjectives, adverbs and intransitive verbs); and "logical to connectors" establishing sets of the nominal terms. Exemplary constrained lists of nominal terms, connectors and descriptors are set forth in the '247 patent. The preferred logical connectors are "and" and "or."

In defining allowed sentence structures, it may be desirable to expand the form classes into subcategories, and characterize allowed sentence formats in terms of the subcategories. The following tables list representative sets of subcategories (and their abbreviations) for nominals, descriptors, and connectors:

TABLE 1

| | | Nominals | |
|---|---|---|---|
| NAME | NAMC | Paris, Boston, Los-Alamos | Names of cities |
| NAME | NAMN | Mexico, France, Germany | Names of nations |
| NAME | NAMP | Bill-Clinton, Richard Nixon | Names of famous people |
| NAME | NAMG | the-Colorado-River, Mt-St.-Helen | Names of rivers, lakes, mountains, etc. |
| NAME | NAMB | WordStream, Microsoft, Oracle | Names of companies and organizations |
| NAME | NAMO | Star-Wars, War-and-Peace, The-Washington-Monument | Names of everything else |

TABLE 1-continued

| | | Nominals | |
|---|---|---|---|
| CURR | CURR | Dollar, Franc, Peso | Names of currency |
| MESR | MESR | feet, kilometer, lbs., ft., liter, tsp. | Units of measurement |
| RATE | RATE | mph | Rates |
| LANG | LANG | Spanish, English, German, French | Names of Languages |
| PRON | PRON | I, You, He | Pronouns |
| NOUN | NOUN | dog, house, merger | General nouns |
| NTME | MNTH | May, June, July | Names of months |
| NTME | DAYS | Monday, Tuesday, Thursday | Days of the week |
| NTME | TIRG | last-week, this-week, next-month, yesterday | Other date references |
| NTME | YEAR | 1903, 1999, 2001 | Years specified as in the examples |
| NTME | TIME | 12:30, 4:00, 9:03 | Times specified as in the examples |
| NTME | DATE | 3/4/99, 4/7/65, 9/23/64 | Dates specified as in the examples |

In Table 1, the entries in the first column represent the grammar category or type of the entry (e.g., name), while the entries of the second columm are four-letter data types that specify the nature of the construction more precisely; the abbreviations utilized for the various data types are apparent from the fourth column, which defines them. The third column provides examples.

TABLE 2

| | Descriptors | |
|---|---|---|
| QNTY | a-few, many, all | Words that modify quantity |
| NUMB | 1, 2, 3, one, two | Numbers represented as digits or words |
| LRGE | million, billion, trillion | The three multipliers listed (left) |
| ADJG | green, large, important, asleep, sad | General adjectives |
| VRIN | dance, explode, sneeze, increase | Intransitive verbs |
| ADVG | frequently, every-Tuesday, on-time | Adverbs of time and method |
| ARTI | the, a | Articles |
| DEMO | this, that, these, those | Demonstratives |
| POSS | my, your, his, her | Possessive |
| PRTI | Mr., Ms. | Formal titles |
| TITL | President, Attorney, Judge | Job titles |
| NATN | Mexican, German, French | Nationalities |

TABLE 3

| | Connectors | |
|---|---|---|
| OFGE | of | as in the captain of the football team |
| LOGO | or | |
| LOGA | and | |
| VTRG | eat, attack, cover, find | General transitive verbs |
| VTRD | send, give, build, sentence | Verbs that are ditransitive |
| PREG | at, into, on, for | General prepositions |
| MOVX | expect-that, says-that, wants-to | Modals that take a subject |
| PRET | on, at, by, before, after | Prepositions of time |
| PRED | to, for, from | Prepositions that work with ditransitives |

TABLE 3-continued

| | Connectors | |
|---|---|---|
| ADCC | because, if, unless, after | Adverbial conjunctions of manner |
| EQUA | is | as in John is the president |

In Tables 2 and 3 the first column lists data types, which are defined by the explanations in the third column, and the second column provides examples.

To expand the range of ideas that are capable of expression, the constrained grammar may permit a defined set of nominal constructions (in addition to the nominal linguistic units listed in Table 1):

TABLE 4

| | Nominal Constructions | |
|---|---|---|
| NAME | NC | London |
| PRON | NC | I |
| NOUN ARTI | NC | The newspaper |
| NOUN QNTY | NC | Many ships |
| NOUN NUMB | NC | 75 houses |
| NOUN NUMB LRGE | NC | 5.3 billion books |
| NOUN DEMO | NC | These books |
| NOUN POSS | NC | His report |
| NOUN ADJG ARTI | NC | An important meeting |
| NOUN ADJG QNTY | NC | A-few American aircraft-carriers |
| NOUN ADJG NUMB | NC | 7 valuable paintings |
| NOUN ADJG NUMB LRGE | NC | 1.2 billion Japanese cars |
| NOUN ADJG DEMO | NC | This used computer |
| NOUN ADJG POSS | NC | Their new contract |
| CURR NUMB | NC | 500.00 dollars |
| CURR NUMB LRGE | NC | 500 billion dollars |
| NAMP PRTI | NC | Mr. Bill-Clinton |
| NAMP TITL | NC | President Bill-Clinton |
| NC OFGE NC | | The president of Sanyo |
| NC LOGA NC | | The president and the CEO |
| NC LOGO NC | | The president or the CEO |

In Table 4, the first column sets forth the constituents of the constructions based on the data types defined in the previous tables. For example, NOUN ARTI includes a noun and an article as defined in Tables 1 and 3. The third column of the table gives examples of the constructions. An 'NC' entry in the second column indicates that the construction itself qualifies as a nominal construction, while the 'NC' entries that appear in the definition of the final three entries stand for any of the previous constructions qualifying as NCs.

Finally, the linguistic units and the nominal constructions are used in defining allowed sentence structures:

TABLE 5

| | Allowed Sentence Constructions | | | |
|---|---|---|---|---|
| NC VRIN | pres.posi.decl | CS | The building explodes |
| NC VRIN | past.posi.decl | CS | |
| NC VRIN | futr.posi.decl | CS | |
| NC VRIN | pres.nega.decl | CS | |
| NC VRIN | past.nega.decl | CS | |
| NC VRIN | futr.nega.decl | CS | |
| NC VRIN | pres.posi.intr | CS | |
| NC VRIN | past.posi.intr | CS | |
| NC VRIN | futr.posi.intr | CS | |
| NC VRIN | pres.posi.inwy | CS | |

TABLE 5-continued

| | Allowed Sentence Constructions | | |
|---|---|---|---|
| NC VRIN | past.posi.inwy | CS | |
| NC VRIN | futr.posi.inwy | CS | |
| NC VRIN ADVG | pres.posi.decl | CS | |
| NC VRIN ADVG | past.posi.decl | CS | |
| NC VRIN ADVG | futr.posi.decl | CS | |
| NC VRIN ADVG | pres.nega.decl | CS | |
| NC VRIN ADVG | past.nega.decl | CS | |
| NC VRIN ADVG | futr.nega.decl | CS | |
| NC VRIN ADVG | pres.posi.intr | CS | |
| NC VRIN ADVG | past.posi.intr | CS | |
| NC VRIN ADVG | futr.posi.intr | CS | |
| NC VRIN ADVG | pres.posi.inwy | CS | |
| NC VRIN ADVG | past.posi.inwy | CS | |
| NC VRIN ADVG | futr.posi.inwy | CS | |
| NC ADJG | pres.posi.decl | CS | The meeting is important |
| NC ADJG | past.posi.decl | CS | |
| NC ADJG | futr.posi.decl | CS | |
| NC ADJG | pres.nega.decl | CS | |
| NC ADJG | past.nega.decl | CS | |
| NC ADJG | futr.nega.decl | CS | |
| NC ADJG | pres.posi.intr | CS | |
| NC ADJG | past.posi.intr | CS | |
| NC ADJG | futr.posi.intr | CS | |
| NC ADJG | pres.posi.inwy | CS | |
| NC ADJG | past.posi.inwy | CS | |
| NC ADJG | futr.posi.inwy | CS | |
| NC ADJG ADVG | pres.posi.decl | CS | |
| NC ADJG ADVG | past.posi.decl | CS | |
| NC ADJG ADVG | futr.posi.decl | CS | |
| NC ADJG ADVG | pres.nega.decl | CS | |
| NC ADJG ADVG | past.nega.decl | CS | |
| NC ADJG ADVG | futr.nega.decl | CS | |
| NC ADJG ADVG | pres.posi.intr | CS | |
| NC ADJG ADVG | past.posi.intr | CS | |
| NC ADJG ADVG | futr.posi.intr | CS | |
| NC ADJG ADVG | pres.posi.inwy | CS | |
| NC ADJG ADVG | past.posi.inwy | CS | |
| NC ADJG ADVG | futr.posi.inwy | CS | |
| NC EQUA NC | pres.posi.decl | CS | Bill-Clinton is the president |
| NC EQUA NC | past.posi.decl | CS | |
| NC EQUA NC | futr.posi.decl | CS | |
| NC EQUA NC | pres.nega.decl | CS | |
| NC EQUA NC | past.nega.decl | CS | |
| NC EQUA NC | futr.nega.decl | CS | |
| NC EQUA NC | pres.posi.intr | CS | |
| NC EQUA NC | past.posi.intr | CS | |
| NC EQUA NC | futr.posi.intr | CS | |
| NC EQUA NC | pres.posi.inwy | CS | |
| NC EQUA NC | past.posi.inwy | CS | |
| NC EQUA NC | futr.posi.inwy | CS | |
| NC EQUA NC ADVG | pres.posi.decl | CS | |
| NC EQUA NC ADVG | past.posi.decl | CS | |
| NC EQUA NC ADVG | futr.posi.decl | CS | |
| NC EQUA NC ADVG | pres.nega.decl | CS | |
| NC EQUA NC ADVG | past.nega.decl | CS | |
| NC EQUA NC ADVG | futr.nega.decl | CS | |
| NC EQUA NC ADVG | pres.posi.intr | CS | |
| NC EQUA NC ADVG | past.posi.intr | CS | |
| NC EQUA NC ADVG | futr.posi.intr | CS | |
| NC EQUA NC ADVG | pres.posi.inwy | CS | |
| NC EQUA NC ADVG | past.posi.inwy | CS | |
| NC EQUA NC ADVG | futr.posi.inwy | CS | |
| NC VTRA NC | pres.posi.decl | CS | Spain attacks France |
| NC VTRA NC | past.posi.decl | CS | |
| NC VTRA NC | futr.posi.decl | CS | |
| NC VTRA NC | pres.nega.decl | CS | |
| NC VTRA NC | past.nega.decl | CS | |
| NC VTRA NC | futr.nega.decl | CS | |
| NC VTRA NC | pres.posi.intr | CS | |
| NC VTRA NC | past.posi.intr | CS | |
| NC VTRA NC | futr.posi.intr | CS | |
| NC VTRA NC | pres.posi.inwy | CS | |
| NC VTRA NC | past.posi.inwy | CS | |

TABLE 5-continued

Allowed Sentence Constructions

| | | | |
|---|---|---|---|
| NC VTRA NC | futr.posi.inwy | CS | |
| NC VTRA NC ADVG | pres.posi.decl | CS | |
| NC VTRA NC ADVG | past.posi.decl | CS | |
| NC VTRA NC ADVG | futr.posi.decl | CS | |
| NC VTRA NC ADVG | pres.nega.decl | CS | |
| NC VTRA NC ADVG | past.nega.decl | CS | |
| NC VTRA NC ADVG | futr.nega.decl | CS | |
| NC VTRA NC ADVG | pres.posi.intr | CS | |
| NC VTRA NC ADVG | past.posi.intr | CS | |
| NC VTRA NC ADVG | futr.posi.intr | CS | |
| NC VTRA NC ADVG | pres.posi.inwy | CS | |
| NC VTRA NC ADVG | past.posi.inwy | CS | |
| NC VTRA NC ADVG | futr.posi.inwy | CS | |
| NC PREG NC | pres.posi.decl | CS | The document is inside-of the safe |
| NC PREG NC | past.posi.decl | CS | |
| NC PREG NC | futr.posi.decl | CS | |
| NC PREG NC | pres.nega.decl | CS | |
| NC PREG NC | past.nega.decl | CS | |
| NC PREG NC | futr.nega.decl | CS | |
| NC PREG NC | pres.posi.intr | CS | |
| NC PREG NC | past.posi.intr | CS | |
| NC PREG NC | futr.posi.intr | CS | |
| NC PREG NC | pres.posi.inwy | CS | |
| NC PREG NC | past.posi.inwy | CS | |
| NC PREG NC | futr.posi.inwy | CS | |
| NC PREG NC ADVG | pres.posi.decl | CS | |
| NC PREG NC ADVG | past.posi.decl | CS | |
| NC PREG NC ADVG | futr.posi.decl | CS | |
| NC PREG NC ADVG | pres.nega.decl | CS | |
| NC PREG NC ADVG | past.nega.decl | CS | |
| NC PREG NC ADVG | futr.nega.decl | CS | |
| NC PREG NC ADVG | pres.posi.intr | CS | |
| NC PREG NC ADVG | past.posi.intr | CS | |
| NC PREG NC ADVG | futr.posi.intr | CS | |
| NC PREG NC ADVG | pres.posi.inwy | CS | |
| NC PREG NC ADVG | past.posi.inwy | CS | |
| NC PREG NC ADVG | futr.posi.inwy | CS | |
| NC VTRD NC PRED NC | pres.posi.decl | CS | The lawyer sent the document to Japan |
| NC VTRD NC PRED NC | past.posi.decl | CS | |
| NC VTRD NC PRED NC | futr.posi.decl | CS | |
| NC VTRD NC PRED NC | pres.nega.decl | CS | |
| NC VTRD NC PRED NC | past.nega.decl | CS | |
| NC VTRD NC PRED NC | futr.nega.decl | CS | |
| NC VTRD NC PRED NC | pres.posi.intr | CS | |
| NC VTRD NC PRED NC | past.posi.intr | CS | |
| NC VTRD NC PRED NC | futr.posi.intr | CS | |
| NC VTRD NC PRED NC | pres.posi.inwy | CS | |
| NC VTRD NC PRED NC | past.posi.inwy | CS | |
| NC VTRD NC PRED NC | futr.posi.inwy | CS | |
| NC VTRD NC PRED NC ADVG | pres.posi.decl | CS | |
| NC VTRD NC PRED NC ADVG | past.posi.decl | CS | |
| NC VTRD NC PRED NC ADVG | futr.posi.decl | CS | |
| NC VTRD NC PRED NC ADVG | pres.nega.decl | CS | |
| NC VTRD NC PRED NC ADVG | past.nega.decl | CS | |
| NC VTRD NC PRED NC ADVG | futr.nega.decl | CS | |
| NC VTRD NC PRED NC ADVG | pres.posi.intr | CS | |
| NC VTRD NC PRED NC ADVG | past.posi.intr | CS | |
| NC VTRD NC PRED NC ADVG | futr.posi.intr | CS | |
| NC VTRD NC PRED NC ADVG | pres.posi.inwy | CS | |
| NC VTRD NC PRED NC ADVG | past.posi.inwy | CS | |
| NC VTRD NC PRED NC ADVG | futr.posi.inwy | CS | |
| NC MOVX NC VRIN | pres.posi.decl | | The lawyer wants to swim |
| NC MOVX NC VRIN | past.posi.decl | | |
| NC MOVX NC VRIN | futr.posi.decl | | |
| NC MOVX NC VRIN | pres.nega.decl | | |
| NC MOVX NC VRIN | past.nega.decl | | |
| NC MOVX NC VRIN | futr.nega.decl | | |
| NC MOVX NC VRIN | pres.posi.intr | | |
| NC MOVX NC VRIN | past.posi.intr | | |
| NC MOVX NC VRIN | futr.posi.intr | | |
| NC MOVX NC VRIN | pres.posi.inwy | | |
| NC MOVX NC VRIN | past.posi.inwy | | |
| NC MOVX NC VRIN | futr.posi.inwy | | |
| NC MOVX NC VRIN ADVG | pres.posi.decl | | |
| NC MOVX NC VRIN ADVG | past.posi.decl | | |
| NC MOVX NC VRIN ADVG | futr.posi.decl | | |
| NC MOVX NC VRIN ADVG | pres.nega.decl | | |
| NC MOVX NC VRIN ADVG | past.nega.decl | | |
| NC MOVX NC VRIN ADVG | futr.nega.decl | | |
| NC MOVX NC VRIN ADVG | pres.posi.intr | | |
| NC MOVX NC VRIN ADVG | past.posi.intr | | |
| NC MOVX NC VRIN ADVG | futr.posi.intr | | |
| NC MOVX NC VRIN ADVG | pres.posi.inwy | | |
| NC MOVX NC VRIN ADVG | past.posi.inwy | | |
| NC MOVX NC VRIN ADVG | futr.posi.inwy | | |
| NC MOVX NC ADJG | pres.posi.decl | | The president believes that the meeting is important |
| NC MOVX NC ADJG | past.posi.decl | | |
| NC MOVX NC ADJG | futr.posi.decl | | |
| NC MOVX NC ADJG | pres.nega.decl | | |
| NC MOVX NC ADJG | past.nega.decl | | |
| NC MOVX NC ADJG | futr.nega.decl | | |
| NC MOVX NC ADJG | pres.posi.intr | | |
| NC MOVX NC ADJG | past.posi.intr | | |
| NC MOVX NC ADJG | futr.posi.intr | | |
| NC MOVX NC ADJG | pres.posi.inwy | | |
| NC MOVX NC ADJG | past.posi.inwy | | |
| NC MOVX NC ADJG | futr.posi.inwy | | |
| NC MOVX NC ADJG ADVG | pres.posi.decl | | |
| NC MOVX NC ADJG ADVG | past.posi.decl | | |
| NC MOVX NC ADJG ADVG | futr.posi.decl | | |
| NC MOVX NC ADJG ADVG | pres.nega.decl | | |
| NC MOVX NC ADJG ADVG | past.nega.decl | | |
| NC MOVX NC ADJG ADVG | futr.nega.decl | | |
| NC MOVX NC ADJG ADVG | pres.posi.intr | | |
| NC MOVX NC ADJG ADVG | past.posi.intr | | |
| NC MOVX NC ADJG ADVG | futr.posi.intr | | |
| NC MOVX NC ADJG ADVG | pres.posi.inwy | | |
| NC MOVX NC ADJG ADVG | past.posi.inwy | | |
| NC MOVX NC ADJG ADVG | futr.posi.inwy | | |
| NC MOVX NC EQUA NC | pres.posi.decl | | The document knows that Bill-Clinton is the president |
| NC MOVX NC EQUA NC | past.posi.decl | | |
| NC MOVX NC EQUA NC | futr.posi.decl | | |
| NC MOVX NC EQUA NC | pres.nega.decl | | |
| NC MOVX NC EQUA NC | past.nega.decl | | |
| NC MOVX NC EQUA NC | futr.nega.decl | | |
| NC MOVX NC EQUA NC | pres.posi.intr | | |
| NC MOVX NC EQUA NC | past.posi.intr | | |
| NC MOVX NC EQUA NC | futr.posi.intr | | |
| NC MOVX NC EQUA NC | pres.posi.inwy | | |
| NC MOVX NC EQUA NC | past.posi.inwy | | |
| NC MOVX NC EQUA NC | futr.posi.inwy | | |
| NC MOVX NC VTRA NC | pres.posi.decl | | |
| NC MOVX NC VTRA NC | past.posi.decl | | |
| NC MOVX NC VTRA NC | futr.posi.decl | | |
| NC MOVX NC VTRA NC | pres.nega.decl | | |
| NC MOVX NC VTRA NC | past.nega.decl | | |
| NC MOVX NC VTRA NC | futr.nega.decl | | |
| NC MOVX NC VTRA NC | pres.posi.intr | | |
| NC MOVX NC VTRA NC | past.posi.intr | | |
| NC MOVX NC VTRA NC | futr.posi.intr | | |
| NC MOVX NC VTRA NC | pres.posi.inwy | | |
| NC MOVX NC VTRA NC | past.posi.inwy | | |
| NC MOVX NC VTRA NC | futr.posi.inwy | | |
| NC MOVX NC VTRA NC ADVG | pres.posi.decl | | |
| NC MOVX NC VTRA NC ADVG | past.posi.decl | | |

TABLE 5-continued

Allowed Sentence Constructions

| | |
|---|---|
| NC MOVX NC VTRA NC ADVG | futr.posi.decl |
| NC MOVX NC VTRA NC ADVG | pres.nega.decl |
| NC MOVX NC VTRA NC ADVG | past.nega.decl |
| NC MOVX NC VTRA NC ADVG | futr.nega.decl |
| NC MOVX NC VTRA NC ADVG | pres.posi.intr |
| NC MOVX NC VTRA NC ADVG | past.posi.intr |
| NC MOVX NC VTRA NC ADVG | futr.posi.intr |
| NC MOVX NC VTRA NC ADVG | pres.posi.inwy |
| NC MOVX NC VTRA NC ADVG | past.posi.inwy |
| NC MOVX NC VTRA NC ADVG | futr.posi.inwy |
| NC MOVX NC PREG NC | pres.posi.decl |
| NC MOVX NC PREG NC | past.posi.decl |
| NC MOVX NC PREG NC | futr.posi.decl |
| NC MOVX NC PREG NC | pres.nega.decl |
| NC MOVX NC PREG NC | past.nega.decl |
| NC MOVX NC PREG NC | futr.nega.decl |
| NC MOVX NC PREG NC | pres.posi.intr |
| NC MOVX NC PREG NC | past.posi.intr |
| NC MOVX NC PREG NC | futr.posi.intr |
| NC MOVX NC PREG NC | pres.posi.inwy |
| NC MOVX NC PREG NC | past.posi.inwy |
| NC MOVX NC PREG NC | futr.posi.inwy |
| NC MOVX NC PREG NC ADVG | pres.posi.decl |
| NC MOVX NC PREG NC ADVG | past.posi.decl |
| NC MOVX NC PREG NC ADVG | futr.posi.decl |
| NC MOVX NC PREG NC ADVG | pres.nega.decl |
| NC MOVX NC PREG NC ADVG | past.nega.decl |
| NC MOVX NC PREG NC ADVG | futr.nega.decl |
| NC MOVX NC PREG NC ADVG | pres.posi.intr |
| NC MOVX NC PREG NC ADVG | past.posi.intr |
| NC MOVX NC PREG NC ADVG | futr.posi.intr |
| NC MOVX NC PREG NC ADVG | pres.posi.inwy |
| NC MOVX NC PREG NC ADVG | past.posi.inwy |
| NC MOVX NC PREG NC ADVG | futr.posi.inwy |
| NC MOVX NC VTRD NC PRED NC | pres.posi.decl |
| NC MOVX NC VTRD NC PRED NC | past.posi.decl |
| NC MOVX NC VTRD NC PRED NC | futr.posi.decl |
| NC MOVX NC VTRD NC PRED NC | pres.nega.decl |
| NC MOVX NC VTRD NC PRED NC | past.nega.decl |
| NC MOVX NC VTRD NC PRED NC | futr.nega.decl |
| NC MOVX NC VTRD NC PRED NC | pres.posi.intr |
| NC MOVX NC VTRD NC PRED NC | past.posi.intr |
| NC MOVX NC VTRD NC PRED NC | futr.posi.intr |
| NC MOVX NC VTRD NC PRED NC | pres.posi.inwy |
| NC MOVX NC VTRD NC PRED NC | past.posi.inwy |
| NC MOVX NC VTRD NC PRED NC | futr.posi.inwy |
| NC MOVX NC VTRD NC PRED NC ADVG | pres.posi.decl |
| NC MOVX NC VTRD NC PRED NC ADVG | past.posi.decl |
| NC MOVX NC VTRD NC PRED NC ADVG | futr.posi.decl |
| NC MOVX NC VTRD NC PRED NC ADVG | pres.nega.decl |
| NC MOVX NC VTRD NC PRED NC ADVG | past.nega.decl |
| NC MOVX NC VTRD NC PRED NC ADVG | futr.nega.decl |
| NC MOVX NC VTRD NC PRED NC ADVG | pres.posi.intr |
| NC MOVX NC VTRD NC PRED NC ADVG | past.posi.intr |
| NC MOVX NC VTRD NC PRED NC ADVG | futr.posi.intr |
| NC MOVX NC VTRD NC PRED NC ADVG | pres.posi.inwy |
| NC MOVX NC VTRD NC PRED NC ADVG | past.posi.inwy |
| NC MOVX NC VTRD NC PRED NC ADVG | futr.posi.inwy |
| NC VRIN PRET NTME | pres.posi.decl |
| NC VRIN PRET NTME | past.posi.decl |
| NC VRIN PRET NTME | futr.posi.decl |
| NC VRIN PRET NTME | pres.nega.decl |
| NC VRIN PRET NTME | past.nega.decl |
| NC VRIN PRET NTME | futr.nega.decl |
| NC VRIN PRET NTME | pres.posi.intr |
| NC VRIN PRET NTME | past.posi.intr |
| NC VRIN PRET NTME | futr.posi.intr |
| NC VRIN PRET NTME | pres.posi.inwy |
| NC VRIN PRET NTME | past.posi.inwy |
| NC VRIN PRET NTME | futr.posi.inwy |
| NC VRIN PRET NTME ADVG | pres.posi.decl |
| NC VRIN PRET NTME ADVG | past.posi.decl |
| NC VRIN PRET NTME ADVG | futr.posi.decl |
| NC VRIN PRET NTME ADVG | pres.nega.decl |
| NC VRIN PRET NTME ADVG | past.nega.decl |
| NC VRIN PRET NTME ADVG | futr.nega.decl |
| NC VRIN PRET NTME ADVG | pres.posi.intr |
| NC VRIN PRET NTME ADVG | past.posi.intr |
| NC VRIN PRET NTME ADVG | futr.posi.intr |
| NC VRIN PRET NTME ADVG | pres.posi.inwy |
| NC VRIN PRET NTME ADVG | past.posi.inwy |
| NC VRIN PRET NTME ADVG | futr.posi.inwy |
| NC ADJG PRET NTME | pres.posi.decl |
| NC ADJG PRET NTME | past.posi.decl |
| NC ADJG PRET NTME | futr.posi.decl |
| NC ADJG PRET NTME | pres.nega.decl |
| NC ADJG PRET NTME | past.nega.decl |
| NC ADJG PRET NTME | futr.nega.decl |
| NC ADJG PRET NTME | pres.posi.intr |
| NC ADJG PRET NTME | past.posi.intr |
| NC ADJG PRET NTME | futr.posi.intr |
| NC ADJG PRET NTME | pres.posi.inwy |
| NC ADJG PRET NTME | past.posi.inwy |
| NC ADJG PRET NTME | futr.posi.inwy |
| NC ADJG PRET NTME ADVG | pres.posi.decl |
| NC ADJG PRET NTME ADVG | past.posi.decl |
| NC ADJG PRET NTME ADVG | futr.posi.decl |
| NC ADJG PRET NTME ADVG | pres.nega.decl |
| NC ADJG PRET NTME ADVG | past.nega.decl |
| NC ADJG PRET NTME ADVG | futr.nega.decl |
| NC ADJG PRET NTME ADVG | pres.posi.intr |
| NC ADJG PRET NTME ADVG | past.posi.intr |
| NC ADJG PRET NTME ADVG | futr.posi.intr |
| NC ADJG PRET NTME ADVG | pres.posi.inwy |
| NC ADJG PRET NTME ADVG | past.posi.inwy |
| NC ADJG PRET NTME ADVG | futr.posi.inwy |
| NC EQUA NC PRET NTME | pres.posi.decl |
| NC EQUA NC PRET NTME | past.posi.decl |
| NC EQUA NC PRET NTME | futr.posi.decl |

TABLE 5-continued

Allowed Sentence Constructions

| | |
|---|---|
| NC EQUA NC PRET NTME | pres.nega.decl |
| NC EQUA NC PRET NTME | past.nega.decl |
| NC EQUA NC PRET NTME | futr.nega.decl |
| NC EQUA NC PRET NTME | pres.posi.intr |
| NC EQUA NC PRET NTME | past.posi.intr |
| NC EQUA NC PRET NTME | futr.posi.intr |
| NC EQUA NC PRET NTME | pres.posi.inwy |
| NC EQUA NC PRET NTME | past.posi.inwy |
| NC EQUA NC PRET NTME | futr.posi.inwy |
| NC EQUA NC PRET NTME ADVG | pres.posi.decl |
| NC EQUA NC PRET NTME ADVG | past.posi.decl |
| NC EQUA NC PRET NTME ADVG | futr.posi.decl |
| NC EQUA NC PRET NTME ADVG | pres.nega.decl |
| NC EQUA NC PRET NTME ADVG | past.nega.decl |
| NC EQUA NC PRET NTME ADVG | futr.nega.decl |
| NC EQUA NC PRET NTME ADVG | pres.posi.intr |
| NC EQUA NC PRET NTME ADVG | past.posi.intr |
| NC EQUA NC PRET NTME ADVG | futr.posi.intr |
| NC EQUA NC PRET NTME ADVG | pres.posi.inwy |
| NC EQUA NC PRET NTME ADVG | past.posi.inwy |
| NC EQUA NC PRET NTME ADVG | futr.posi.inwy |
| NC VTRA NC PRET NTME | pres.posi.decl |
| NC VTRA NC PRET NTME | past.posi.decl |
| NC VTRA NC PRET NTME | futr.posi.decl |
| NC VTRA NC PRET NTME | pres.nega.decl |
| NC VTRA NC PRET NTME | past.nega.decl |
| NC VTRA NC PRET NTME | futr.nega.decl |
| NC VTRA NC PRET NTME | pres.posi.intr |
| NC VTRA NC PRET NTME | past.posi.intr |
| NC VTRA NC PRET NTME | futr.posi.intr |
| NC VTRA NC PRET NTME | pres.posi.inwy |
| NC VTRA NC PRET NTME | past.posi.inwy |
| NC VTRA NC PRET NTME | futr.posi.inwy |
| NC VTRA NC PRET NTME ADVG | pres.posi.decl |
| NC VTRA NC PRET NTME ADVG | past.posi.decl |
| NC VTRA NC PRET NTME ADVG | futr.posi.decl |
| NC VTRA NC PRET NTME ADVG | pres.nega.decl |
| NC VTRA NC PRET NTME ADVG | past.nega.decl |
| NC VTRA NC PRET NTME ADVG | futr.nega.decl |
| NC VTRA NC PRET NTME ADVG | pres.posi.intr |
| NC VTRA NC PRET NTME ADVG | past.posi.intr |
| NC VTRA NC PRET NTME ADVG | futr.posi.intr |
| NC VTRA NC PRET NTME ADVG | pres.posi.inwy |
| NC VTRA NC PRET NTME ADVG | past.posi.inwy |
| NC VTRA NC PRET NTME ADVG | futr.posi.inwy |
| NC PREG NC PRET NTME | pres.posi.decl |
| NC PREG NC PRET NTME | past.posi.decl |
| NC PREG NC PRET NTME | futr.posi.decl |
| NC PREG NC PRET NTME | pres.nega.decl |
| NC PREG NC PRET NTME | past.nega.decl |
| NC PREG NC PRET NTME | futr.nega.decl |
| NC PREG NC PRET NTME | pres.posi.intr |
| NC PREG NC PRET NTME | past.posi.intr |
| NC PREG NC PRET NTME | futr.posi.intr |
| NC PREG NC PRET NTME | pres.posi.inwy |
| NC PREG NC PRET NTME | past.posi.inwy |
| NC PREG NC PRET NTME | futr.posi.inwy |
| NC PREG NC PRET NTME ADVG | pres.posi.decl |
| NC PREG NC PRET NTME ADVG | past.posi.decl |
| NC PREG NC PRET NTME ADVG | futr.posi.decl |
| NC PREG NC PRET NTME ADVG | pres.nega.decl |
| NC PREG NC PRET NTME ADVG | past.nega.decl |
| NC PREG NC PRET NTME ADVG | futr.nega.decl |
| NC PREG NC PRET NTME ADVG | pres.posi.intr |
| NC PREG NC PRET NTME ADVG | past.posi.intr |
| NC PREG NC PRET NTME ADVG | futr.posi.intr |
| NC PREG NC PRET NTME ADVG | pres.posi.inwy |
| NC PREG NC PRET NTME ADVG | past.posi.inwy |
| NC PREG NC PRET NTME ADVG | futr.posi.inwy |
| NC VTRD NC PRED NC PRET NTME | pres.posi.decl |
| NC VTRD NC PRED NC PRET NTME | past.posi.decl |
| NC VTRD NC PRED NC PRET NTME | futr.posi.decl |
| NC VTRD NC PRED NC PRET NTME | pres.nega.decl |
| NC VTRD NC PRED NC PRET NTME | past.nega.decl |
| NC VTRD NC PRED NC PRET NTME | futr.nega.decl |
| NC VTRD NC PRED NC PRET NTME | pres.posi.intr |
| NC VTRD NC PRED NC PRET NTME | past.posi.intr |
| NC VTRD NC PRED NC PRET NTME | futr.posi.intr |
| NC VTRD NC PRED NC PRET NTME | pres.posi.inwy |
| NC VTRD NC PRED NC PRET NTME | past.posi.inwy |
| NC VTRD NC PRED NC PRET NTME | futr.posi.inwy |
| NC VTRD NC PRED NC PRET NTME ADVG | pres.posi.decl |
| NC VTRD NC PRED NC PRET NTME ADVG | past.posi.decl |
| NC VTRD NC PRED NC PRET NTME ADVG | futr.posi.decl |
| NC VTRD NC PRED NC PRET NTME ADVG | pres.nega.decl |
| NC VTRD NC PRED NC PRET NTME ADVG | past.nega.decl |
| NC VTRD NC PRED NC PRET NTME ADVG | futr.nega.decl |
| NC VTRD NC PRED NC PRET NTME ADVG | pres.posi.intr |
| NC VTRD NC PRED NC PRET NTME ADVG | past.posi.intr |
| NC VTRD NC PRED NC PRET NTME ADVG | futr.posi.intr |
| NC VTRD NC PRED NC PRET NTME ADVG | pres.posi.inwy |
| NC VTRD NC PRED NC PRET NTME ADVG | past.posi.inwy |
| NC VTRD NC PRED NC PRET NTME ADVG | futr.posi.inwy |
| CS ADCC NC VRIN | pres.posi.decl |

TABLE 5-continued

Allowed Sentence Constructions

| | |
|---|---|
| CS ADCC NC VRIN | past.posi.decl |
| CS ADCC NC VRIN | futr.posi.decl |
| CS ADCC NC VRIN | pres.nega.decl |
| CS ADCC NC VRIN | past.nega.decl |
| CS ADCC NC VRIN | futr.nega.decl |
| CS ADCC NC VRIN | pres.posi.intr |
| CS ADCC NC VRIN | past.posi.intr |
| CS ADCC NC VRIN | futr.posi.intr |
| CS ADCC NC VRIN | pres.posi.inwy |
| CS ADCC NC VRIN | past.posi.inwy |
| CS ADCC NC VRIN | futr.posi.inwy |
| CS ADCC NC VRIN ADVG | pres.posi.decl |
| CS ADCC NC VRIN ADVG | past.posi.decl |
| CS ADCC NC VRIN ADVG | futr.posi.decl |
| CS ADCC NC VRIN ADVG | pres.nega.decl |
| CS ADCC NC VRIN ADVG | past.nega.decl |
| CS ADCC NC VRIN ADVG | futr.nega.decl |
| CS ADCC NC VRIN ADVG | pres.posi.intr |
| CS ADCC NC VRIN ADVG | past.posi.intr |
| CS ADCC NC VRIN ADVG | futr.posi.intr |
| CS ADCC NC VRIN ADVG | pres.posi.inwy |
| CS ADCC NC VRIN ADVG | past.posi.inwy |
| CS ADCC NC VRIN ADVG | futr.posi.inwy |
| CS ADCC NC ADJG | pres.posi.decl |
| CS ADCC NC ADJG | past.posi.decl |
| CS ADCC NC ADJG | futr.posi.decl |
| CS ADCC NC ADJG | pres.nega.decl |
| CS ADCC NC ADJG | past.nega.decl |
| CS ADCC NC ADJG | futr.nega.decl |
| CS ADCC NC ADJG | pres.posi.intr |
| CS ADCC NC ADJG | past.posi.intr |
| CS ADCC NC ADJG | futr.posi.intr |
| CS ADCC NC ADJG | pres.posi.inwy |
| CS ADCC NC ADJG | past.posi.inwy |
| CS ACCT NC ADJG | futr.posi.inwy |
| CS ADCC NC ADJG ADVG | pres.posi.decl |
| CS ADCC NC ADJG ADVG | past.posi.decl |
| CS ADCC NC ADJG ADVG | futr.posi.decl |
| CS ADCC NC ADJG ADVG | pres.nega.decl |
| CS ADCC NC ADJG ADVG | past.nega.decl |
| CS ADCC NC ADJG ADVG | futr.nega.decl |
| CS ADCC NC ADJG ADVG | pres.posi.intr |
| CS ADCC NC ADJG ADVG | past.posi.intr |
| CS ADCC NC ADJG ADVG | futr.posi.intr |
| CS ADCC NC ADJG ADVG | pres.posi.inwy |
| CS ADCC NC ADJG ADVG | past.posi.inwy |
| CS ADCC NC ADJG ADVG | futr.posi.inwy |
| CS ADCC NC EQUA NC | pres.posi.decl |
| CS ADCC NC EQUA NC | past.posi.decl |
| CS ADCC NC EQUA NC | futr.posi.decl |
| CS ADCC NC EQUA NC | pres.nega.decl |
| CS ADCC NC EQUA NC | past.nega.decl |
| CS ADCC NC EQUA NC | futr.nega.decl |
| CS ADCC NC EQUA NC | pres.posi.intr |
| CS ADCC NC EQUA NC | past.posi.intr |
| CS ADCC NC EQUA NC | futr.posi.intr |
| CS ADCC NC EQUA NC | pres.posi.inwy |
| CS ADCC NC EQUA NC | past.posi.inwy |
| CS ADCC NC EQUA NC | futr.posi.inwy |
| CS ADCC NC EQUA NC ADVG | pres.posi.decl |
| CS ADCC NC EQUA NC ADVG | past.posi.decl |
| CS ADCC NC EQUA NC ADVG | futr.posi.decl |
| CS ADCC NC EQUA NC ADVG | pres.nega.decl |
| CS ADCC NC EQUA NC ADVG | past.nega.decl |
| CS ADCC NC EQUA NC ADVG | futr.nega.decl |
| CS ADCC NC EQUA NC ADVG | pres.posi.intr |
| CS ADCC NC EQUA NC ADVG | past.posi.intr |
| CS ADCC NC EQUA NC ADVG | futr.posi.intr |
| CS ADCC NC EQUA NC ADVG | pres.posi.inwy |
| CS ADCC NC EQUA NC ADVG | past.posi.inwy |
| CS ADCC NC EQUA NC ADVG | futr.posi.inwy |
| CS ADCC NC VTRA NC | pres.posi.decl |
| CS ADCC NC VTRA NC | past.posi.decl |
| CS ADCC NC VTRA NC | futr.posi.decl |
| CS ADCC NC VTRA NC | pres.nega.decl |
| CS ADCC NC VTRA NC | past.nega.decl |
| CS ADCC NC VTRA NC | futr.nega.decl |
| CS ADCC NC VTRA NC | pres.posi.intr |
| CS ADCC NC VTRA NC | past.posi.intr |
| CS ADCC NC VTRA NC | futr.posi.intr |
| CS ADCC NC VTRA NC | pres.posi.inwy |
| CS ADCC NC VTRA NC | past.posi.inwy |
| CS ADCC NC VTRA NC | futr.posi.inwy |
| CS ADCC NC VTRA NC ADVG | pres.posi.decl |
| CS ADCC NC VTRA NC ADVG | past.posi.decl |
| CS ADCC NC VTRA NC ADVG | futr.posi.decl |
| CS ADCC NC VTRA NC ADVG | pres.nega.decl |
| CS ADCC NC VTRA NC ADVG | past.nega.decl |
| CS ADCC NC VTRA NC ADVG | futr.nega.decl |
| CS ADCC NC VTRA NC ADVG | pres.posi.intr |
| CS ADCC NC VTRA NC ADVG | past.posi.intr |
| CS ADCC NC VTRA NC ADVG | futr.posi.intr |
| CS ADCC NC VTRA NC ADVG | pres.posi.inwy |
| CS ADCC NC VTRA NC ADVG | past.posi.inwy |
| CS ADCC NC VTRA NC ADVG | futr.posi.inwy |
| CS ADCC NC PREG NC | pres.posi.decl |
| CS ADCC NC PREG NC | past.posi.decl |
| CS ADCC NC PREG NC | futr.posi.decl |
| CS ADCC NC PREG NC | pres.nega.decl |
| CS ADCC NC PREG NC | past.nega.decl |
| CS ADCC NC PREG NC | futr.nega.decl |
| CS ADCC NC PREG NC | pres.posi.intr |
| CS ADCC NC PREG NC | past.posi.intr |
| CS ADCC NC PREG NC | futr.posi.intr |
| CS ADCC NC PREG NC | pres.posi.inwy |
| CS ADCC NC PREG NC | past.posi.inwy |
| CS ADCC NC PREG NC | futr.posi.inwy |
| CS ADCC NC PREG NC ADVG | pres.posi.decl |
| CS ADCC NC PREG NC ADVG | past.posi.decl |
| CS ADCC NC PREG NC ADVG | futr.posi.decl |
| CS ADCC NC PREG NC ADVG | pres.nega.decl |
| CS ADCC NC PREG NC ADVG | past.nega.decl |
| CS ADCC NC PREG NC ADVG | futr.nega.decl |
| CS ADCC NC PREG NC ADVG | pres.posi.intr |
| CS ADCC NC PREG NC ADVG | past.posi.intr |
| CS ADCC NC PREG NC ADVG | futr.posi.intr |
| CS ADCC NC PREG NC ADVG | pres.posi.inwy |
| CS ADCC NC PREG NC ADVG | past.posi.inwy |
| CS ADCC NC PREG NC ADVG | futr.posi.inwy |
| CS ADCC NC VTRD NC PRED NC | pres.posi.decl |
| CS ADCC NC VTRD NC PRED NC | past.posi.decl |
| CS ADCC NC VTRD NC PRED NC | futr.posi.decl |
| CS ADCC NC VTRD NC PRED NC | pres.nega.decl |
| CS ADCC NC VTRD NC PRED NC | past.nega.decl |
| CS ADCC NC VTRD NC PRED | futr.nega.decl |

TABLE 5-continued

| Allowed Sentence Constructions | | |
|---|---|---|
| NC | | |
| CS ADCC NC VTRD NC PRED NC | pres.posi.intr | |
| CS ADCC NC VTRD NC PRED NC | past.posi.intr | |
| CS ADCC NC VTRD NC PRED NC | futr.posi.intr | |
| CS ADCC NC VTRD NC PRED NC | pres.posi.inwy | |
| CS ADCC NC VTRD NC PRED NC | past.posi.inwy | |
| CS ADCC NC VTRD NC PRED NC | futr.posi.inwy | |
| CS ADCC NC VTRD NC PRED NC ADVG | pres.posi.decl | |
| CS ADCC NC VTRD NC PRED NC ADVG | past.posi.decl | |
| CS ADCC NC VTRD NC PRED NC ADVG | futr.posi.decl | |
| CS ADCC NC VTRD NC PRED NC ADVG | pres.nega.decl | |
| CS ADCC NC VTRD NC PRED NC ADVG | past.nega.decl | |
| CS ADCC NC VTRD NC PRED NC ADVG | futr.nega.decl | |
| CS ADCC NC VTRD NC PRED NC ADVG | pres.posi.intr | |
| CS ADCC NC VTRD NC PRED NC ADVG | past.posi.intr | |
| CS ADCC NC VTRD NC PRED NC ADVG | futr.posi.intr | |
| CS ADCC NC VTRD NC PRED NC ADVG | pres.posi.inwy | |
| CS ADCC NC VTRD NC PRED NC ADVG | past.posi.inwy | |
| CS ADCC NC VTRD NC PRED NC ADVG | futr.posi.inwy | |

Once again the first column indicates the constituents of the construction in terms of data types. For example, NC VRIN includes a nominal construction and an intransitive verb as defined in Tables 2 and 4. The fourth column of the table gives occasional examples of the constructions. A 'CS' entry in the third column indicates that the construction itself qualifies as a complete sentence, while the 'CS' entries that appear in the definition of a sentence structure stand for any of the constructions qualifying as CSs.

In addition to definition in terms of constituents (column 1), the sentence structures are also categorized by type (column 3): a sentence structure can be present, past, or future in tense; positive or negative in tone; and declarative or interrogative in mood. Thus, a sentence structure categorized as "past.posi.decl" is past tense, positive in tone, and declarative in mood. Interrogative sentences can also be subcategorized as involving "when/where/what/why" constructions; these are designated "inwy." As shown in Table 5, the NC VRIN construction can assume various permutations of tense, tone, and mood.

The use of allowed sentence-structure "templates" allows for provision of language-specific terms and/or modifications that are required by the nature of the construction (rather than its linguistic content). For example, the system may utilize internal and external representations of the structures:

| Internal Rep. | English Rep. | Japanese Rep. | | |
|---|---|---|---|---|
| NC VTRA NC | She buys bread | Kanoja wa She | pan o bread | kaimashita buys |
| | NC VTRA NC | NC (wa) | NC (o) | VTRA |

"Wa" represents a subject marker and "o" represents a subject marker. For each sentence structure there is a single set of rules for each language that dictates the manner in which sentences are translated into and out of the internal structure. Thus, NC (wa) NC (o) VTRA is the only form that directly corresponds to the internal structure NC VTRA NC for Japanese. NC VTRA NC is the only form that directly corresponds to the internal structure NC VTRA NC for English. In either case, translation is still accomplished in the internal structure by direct word substitution; translation out of the internal structure (according to structure-specific rules tailored to each supported language) represents a form of post-processing which, though language-specific, is nonetheless executed in the same way for all languages; that is, because this post-processing is dictated by sentence structure rather than meaning, the mechanics of its application does not vary among languages. Instead, the translation system simply consults and implements the rules associated with a given sentence structure and language following word substitution.

A representative hardware implementation includes a series of logically or physically distinct electronic databases in which the vocabulary is stored, a computer memory partition for accepting an input in a reference language and structured in accordance with the invention; and an analysis module (generally a processor operated in accordance with stored computer instructions) for (i) addressing the databases with the input to retrieve entries in the target language corresponding thereto, and (ii) translating the sentence by replacing the input with the identified target entries.

With reference to FIG. 1, the illustrated implementation includes a main bidirectional bus 100, over which all system components communicate. The main sequence of instructions effectuating the invention, as well as the databases discussed below, reside on a mass storage device (such as a hard disk or optical storage unit) 102 as well as in a main system memory 104 during operation. Execution of these instructions and effectuation of the functions of the invention is accomplished by a central-processing unit ("CPU") 106.

The user interacts with the system using a keyboard 110 and a position-sensing device (e.g., a mouse) 112. The output of either device can be used to designate information or select particular areas of a screen display 114 to direct functions to be performed by the system.

The main memory 104 contains a group of modules that control the operation of CPU 106 and its interaction with the other hardware components. An operating system 120 directs the execution of low-level, basic system functions such as memory allocation, file management and operation of mass storage devices 102. At a higher level, an analysis module 125, implemented as a series of stored instructions, directs execution of the primary functions performed by the invention, as discussed below. Also at a higher level, instructions defining an editor 127 monitor user input for conformance to the allowed sentence structures. Interaction with editor 127, as well as provision of user text input, is facilitated by an interface 130, which allows straightforward interaction over screen display 114. User interface 130 and editor 127 generate words or graphical images on display 114 to prompt action by the user, accepting user commands from keyboard 110 and/or position-sensing device 112.

Main memory 104 also includes a partition defining a series of databases capable of storing the linguistic units of the invention, and representatively denoted by reference numerals $135_1$, $135_2$, $135_3$, $135_4$. These databases 135, which may be physically distinct (i.e., stored in different memory partitions and as separate files on storage device 102) or logically distinct (i.e., stored in a single memory partition as a structured list that may be addressed as a plurality of databases), each contain all of the linguistic units corresponding to a particular class in at least two languages. In other words, each database is organized as a table each of whose columns lists all of the linguistic units of the particular class in a single language, so that each row contains the same linguistic unit expressed in the different languages the system is capable of translating. In the illustrated implementation, nominal terms are contained in database $135_1$, connectors are contained in database $135_2$, descriptors are contained in database $135_3$, and logical connectors (most simply, "and" and "or") may be contained in database $135_4$.

An input buffer 140 receives from the user, via keyboard 110, input sentences that are preferably structured in accordance with the invention and formatted as described below. In this case, editor 127 initially examines each input sentence for conformance to the structure, and may highlight nonconforming sentence components and/or suggest alternatives. Editor 127 may, instead of receiving input via keyboard 110, allow the user to specify a text file stored on device 102, which is loaded into buffer 140 and examined, sentence by sentence, for conformance to the allowed structure rules. Each inputted sentence is treated as a character string, and using standard string-analysis routines, module 125 identifies the separate linguistic units and the expansion points. It then compares these with templates corresponding to the allowed structures to validate the sentence.

Following input and validation, module 125 processes single linguistic units of each inputted sentence in an iterative fashion, addressing the databases to locate the entries corresponding to each linguistic unit in the given language, as well as the corresponding entries in the target language. Analysis module 125 translates the sentence by replacing the input entries with the entries from the target language, entering the translation into an output buffer 145 whose contents appear on screen display 114. Depending on the application, analysis module 125 may also perform pre- and post-processing to convert conforming entries into the internal representation prior to translation, and following translation, from the internal representation into the target language.

It must be understood that although the modules of main memory 104 have been described separately, this is for clarity of presentation only; so long as the system performs all necessary functions, it is immaterial how they are distributed within the system and the programming architecture thereof. Furthermore, as explained in the '247 patent, input sentences can reflect certain conventions to specify a single one of multiple word senses, and to accommodate verb tenses. Moreover, an additional database 235 can comprise a dictionary of words having multiple meanings, with the invention-recognized format of each sense of the word set next to the various definitions. User interface 130 interprets the user's clicking on one of the definitions as selection thereof, and enters the proper encoding of the word into input buffer 140.

Editor 127 can also include certain utilities that recognize and correct (e.g., after approval by the user) frequently made errors in sentence construction. For example, the present invention ordinarily indicates possession by a named person using the verb "to have"; thus, the sentence "Paul's computer is fast" is represented (in algebraic format) as "paul have (computer fast)" or "(computer of paul) fast"; if the person is unnamed, the usual possessive pronouns may be used (e.g., "(computer my) fast"). Thus, editor 127 can be configured to recognize constructions such as "Paul's" and return the appropriate construction in accordance with the invention.

The present invention can also be adapted for communication over a computer network. In this case, a network communication block 150 provides programming to connect with a computer network, which may be a local-area network ("LAN"), a wide-area network ("WAN"), or the Internet. Communication module 150 drives a network interface 152, which contains data-transmission circuitry to transfer streams of digitally encoded data over the communication lines defining the computer network.

Memory 104 may also contain modules that confer the capability of communicating over the World Wide Web (hereafter the "web"). As is well understood in the art, communication over the Internet is accomplished by encoding information to be transferred into data packets, each of which receives a destination address according to a consistent protocol, and which are reassembled upon receipt by the target computer. A commonly accepted set of protocols for this purpose includes the Internet Protocol, or IP, which dictates routing information; and the transmission control protocol, or TCP, according to which messages are actually broken up into IP packets for transmission for subsequent collection and reassembly. The Internet supports a large variety of information-transfer protocols, and the web represents one of these. Web-accessible information is identified by a uniform resource locator or "URL," which specifies the location of the file in terms of a specific computer and a location on that computer. Any Internet "node"—that is, a computer with an IP address—can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

In the case of Internet connections, data exchange is typically effected over the web by means of web pages rather than a conventional user interface. In this case storage device 102 contains a series of web page templates, which comprise formatting (mark-up) instructions and associated data, and/or so-called "applet" instructions that cause a properly equipped remote computer to present a dynamic display. Management and transmission of a selected web page is handled by a web server module 155, which allows the system to function as a web (http) server.

The markup instructions are executed by an Internet "browser" running a remote computer that has accessed the illustrated system via the web. These markup instructions determine the appearance of the web page on the browser; in effect, the web pages serve as the user interface for the remote computer. Web server 155 transfers user-supplied sentences to editor 127, which reviews them and communicates as necessary with the remote user via appropriately formatted web pages transmitted back to the user by server 155. When the input is determined to conform to the allowed sentence structures, it is passed to analysis module 125 and processed as discussed above. Finally, the translated text is sent to the user in the form of a web page via web server 155.

It will therefore be seen that the foregoing represents a convenient and fast approach to translation among multiple languages. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a portable general-purpose computer using appropriate software instructions, or as hardware circuits, or as mixed hard-ware-software combinations.

What is claimed is:

1. A method of translating information from a first language into a second language, the method comprising the steps of:
   a. receiving a sentence in the first language, the sentence conforming to a constrained grammar consisting of a series of predefined grammar templates which allow for provision of language-specific terms and/or modifications required by the nature of a construction rather than its linguistic content; and
   b. translating the sentence into the second language by direct substitution of terms in the second language for corresponding terms in the first language.

2. The method of claim 1 wherein the translation is accomplished according to steps comprising:
   a. providing reference and target sets of nominal, connector, and descriptor databases in the reference and target languages, each nominal database comprising a series of nominal entries, each connector database comprising a series of connector entries each specifying a relationship between at least two nominal terms, and each descriptor database comprising a series of descriptor entries describing nominal entries, the entries of the reference set of databases corresponding to the entries of the target set of databases, the message containing entries from the reference databases arranged according to rules defining the constrained grammar;
   b. addressing the target set of databases with the message entries to retrieve target entries corresponding thereto; and
   c. translating the sentence by directly substituting the message entries with the target entries.

3. The method of claim 2 wherein the connector items show action, being or state of being.

4. The method of claim 2 wherein the descriptor items describe a quality, quantity, state or type of a nominal entry.

5. The method of claim 1 wherein the translation step comprising substituting terms in the second language for the corresponding terms in the reference language by database lookup.

6. The method of claim 1 wherein the predefined grammar templates comprise the sentence structures set forth in Table 5.

7. The method of claim 1 further comprising the steps of:
   a. maintaining, for each predefined grammar template, a set of translation rules for the first and second languages;
   b. converting the received sentence into an internal structure in accordance with rules specific to the first language; and
   c. following the translation step, converting the translated sentence out of the internal structure in accordance with rules specific to the second language.

8. The method of claim 1 wherein the predefined grammar templates are defined in terms of grammatical units comprising nominal terms, nominal constructions, descriptors and connectors.

9. The method of claim 8 wherein the allowed sentence structures are further specified by categories comprising tense, tone, and mood.

10. Apparatus for translating information from a first language into a second language, the apparatus comprising:
    a. a buffer for receiving a sentence in the first language, the sentence conforming to a constrained grammar comprising a series of predefined grammar templates; and
    b. a processor for translating the sentence into the second language by direct substitution of terms in the second language for corresponding terms in the first language.

11. The apparatus of claim 10 further comprising reference and target sets of nominal, connector, and descriptor databases in reference and target languages, each nominal database comprising a series of nominal entries, each connector database comprising a series of connector entries each specifying a relationship between at least two nominal terms, and each descriptor database comprising a series of descriptor entries describing nominal entries, the message containing entries from the reference set arranged according to rules defining the constrained grammar, the entries of the reference set of databases corresponding to the entries of the target set of databases, the processor being configured to (i) address the target set of databases with the message entries to retrieve target entries corresponding thereto and (ii) translate the message by directly substituting the target entries for the message entries.

12. The apparatus of claim 11 wherein the connector items show action, being or state of being.

13. The apparatus of claim 11 wherein the descriptor items describe a quality, quantity, state or type of a nominal entry.

14. The apparatus of claim 12 further comprising an editor for examining, prior to translation, the received sentence for conformance to one of the predefined grammar templates.

15. The apparatus of claim 10 wherein the allowed sentence types comprise the sentence structures set forth in Table 5.

16. The apparatus of claim 10 further comprising a memory for maintaining, for each predefined grammar template, a set of translation rules for the first and second languages, the processor being configured to (i) convert the received sentence into an internal structure in accordance with rules specific to the first language, and (ii) convert the translated sentence out of the internal structure in accordance with rules specific to the second language.

17. The apparatus of claim 10 wherein the predefined grammar templates are defined in terms of grammatical units comprising nominal terms, nominal constructions, descriptors and connectors.

18. The apparatus of claim 17 wherein the allowed sentence structures are further specified by categories comprising tense, tone, and mood.

* * * * *